United States Patent
Pilli et al.

(10) Patent No.: US 10,629,041 B2
(45) Date of Patent: Apr. 21, 2020

(54) BIOMETRIC FEEDBACK FOR INTRUSION SYSTEM CONTROL

(71) Applicant: Carrier Corporation, Palm Beach Gardens, FL (US)

(72) Inventors: Srinivasa Reddy Pilli, Andhra Pradesh (IN); Vijaylakshmi Bondapalli, Andhra Pradesh (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/127,421

(22) Filed: Sep. 11, 2018

(65) Prior Publication Data

US 2019/0325721 A1    Oct. 24, 2019

(30) Foreign Application Priority Data

Apr. 19, 2018    (IN) .............................. 201811014893

(51) Int. Cl.
*A61B 5/00* (2006.01)
*G08B 13/22* (2006.01)
*G07C 9/00* (2020.01)

(52) U.S. Cl.
CPC ......... *G08B 13/22* (2013.01); *G07C 9/00087* (2013.01); *G07C 2009/00095* (2013.01)

(58) Field of Classification Search
None
See application file for complete search history.

(56) References Cited

U.S. PATENT DOCUMENTS

| | | | |
|---|---|---|---|
| 7,616,110 B2 | 11/2009 | Crump et al. | |
| 8,200,778 B2 | 6/2012 | Edwards et al. | |
| 8,515,515 B2 | 8/2013 | McKenna et al. | |
| 9,215,980 B2 | 12/2015 | Tran et al. | |
| 9,351,640 B2 | 5/2016 | Tran | |
| 9,503,448 B2 | 11/2016 | Logue | |
| 9,760,501 B2 | 9/2017 | Logue | |
| 9,761,073 B2 | 9/2017 | Cheng et al. | |
| 9,787,424 B2 | 10/2017 | Filson et al. | |
| 2003/0212311 A1* | 11/2003 | Nova .................. | A61N 1/37258 600/300 |

(Continued)

FOREIGN PATENT DOCUMENTS

| | | |
|---|---|---|
| WO | 2014047695 A2 | 4/2014 |
| WO | 2016110804 A1 | 7/2016 |
| WO | 2016113693 A1 | 7/2016 |

OTHER PUBLICATIONS

Patent Corporation Treaty, Invitation to Pay Additional Fees and, Where Applicable, Protest Fee, for International Application No. PCT/US2019/027442, dated Jul. 19, 2019 (13 pp.).

(Continued)

*Primary Examiner* — Brent Swarthout
(74) *Attorney, Agent, or Firm* — Cantor Colburn LLP

(57) ABSTRACT

According to an aspect, a system includes a wearable biometric device operable to monitor one or more biometric indicators of a user. The system also includes an intrusion detection system including one or more sensors and a control panel operable to monitor the one or more sensors, establish communication with the wearable biometric device, and perform an action responsive to an event detected by the one or more sensors or the wearable biometric device.

17 Claims, 4 Drawing Sheets

(56) References Cited

U.S. PATENT DOCUMENTS

| | | | |
|---|---|---|---|
| 2009/0243878 A1* | 10/2009 | Ricordi | A61B 5/0002 |
| | | | 340/870.16 |
| 2015/0116107 A1 | 4/2015 | Fadell et al. | |
| 2015/0223705 A1* | 8/2015 | Sadhu | G01S 19/17 |
| | | | 600/301 |
| 2015/0358794 A1* | 12/2015 | Nokhoudian | H04W 4/90 |
| | | | 455/404.1 |
| 2016/0187995 A1* | 6/2016 | Rosewall | H04W 4/02 |
| | | | 345/156 |
| 2016/0285904 A1 | 9/2016 | Ye et al. | |
| 2017/0086672 A1 | 3/2017 | Tran | |
| 2017/0264383 A1 | 9/2017 | Reddy et al. | |
| 2019/0295506 A1* | 9/2019 | O'Neill | G06F 1/1684 |

OTHER PUBLICATIONS

International Application No. PCT/US2019/027442 International Search Report and Written Opinion dated Sep. 10, 2019, 19 pages.

\* cited by examiner

BIOMETRIC FEEDBACK FOR INTRUSION SYSTEM CONTROL

CROSS-REFERENCE TO RELATED APPLICATION

This application claims the benefit of the IN Application No. 201811014893 filed Apr. 19, 2018, which is incorporated herein by reference in its entirety.

BACKGROUND

Intrusion detection systems typically monitor sensors of a localized area to detect opening of doors or windows, motion, glass breakage, smoke, carbon monoxide, and other potentially hazardous conditions. When an intrusion detection system detects an event, the intrusion detection system may send a message or trigger a phone call to a monitoring service that interprets the event and takes a subsequent action, such as calling the police or fire department. A control panel of an intrusion detection system may also include buttons that when pressed result in sending a corresponding message to the monitoring service, for instance, to request dispatch of the fire department, police, or an ambulance. Such systems may require that the user be located at the control panel and be fully conscious to press a button and trigger a request.

BRIEF DESCRIPTION

According to one embodiment, a system includes a wearable biometric device operable to monitor one or more biometric indicators of a user. The system also includes an intrusion detection system with one or more sensors and a control panel operable to monitor the one or more sensors, establish communication with the wearable biometric device, and perform an action responsive to an event detected by the one or more sensors or the wearable biometric device.

In addition to one or more of the features described above, or as an alternative, further embodiments may include where the wearable biometric device is configured to detect a predefined gesture of the user of the wearable biometric device and transmit a command associated with the predefined gesture from the wearable biometric device to the control panel.

In addition to one or more of the features described above, or as an alternative, further embodiments may include where the intrusion detection system includes one or more subsystems, and the control panel is configured to actuate at least one of the subsystems responsive to receiving the command.

In addition to one or more of the features described above, or as an alternative, further embodiments may include where the wearable biometric device is configured to compare the one or more biometric indicators to one or more medical condition indicators and transmit a medical response request to the control panel based on determining that at least one of the medical condition indicators is met.

In addition to one or more of the features described above, or as an alternative, further embodiments may include where the control panel is configured to send an alert message to an assistance response system based on receiving the medical response request.

In addition to one or more of the features described above, or as an alternative, further embodiments may include where the control panel is configured to monitor movement of the wearable biometric device with respect to a predetermined location and trigger an unlocking action of a lock mechanism based on determining that the wearable biometric device is approaching and within a threshold distance of the predetermined location.

In addition to one or more of the features described above, or as an alternative, further embodiments may include where the wearable biometric device is configured to receive a security alert from the control panel responsive to event detection by the one or more sensors of the intrusion detection system and provide an indication of the security alert to the user of the wearable biometric device.

In addition to one or more of the features described above, or as an alternative, further embodiments may include where the wearable biometric device includes one or more biometric sensors, at least one motion sensor, and a position sensor.

According to another embodiment, a method includes establishing communication between a wearable biometric device and a control panel of an intrusion detection system. A predefined gesture of a user of the wearable biometric device is detected. A command associated with the predefined gesture is transmitted from the wearable biometric device to the control panel. A subsystem of the intrusion detection system is actuated responsive to the control panel receiving the command.

In addition to one or more of the features described above, or as an alternative, further embodiments may include where actuating the subsystem of the intrusion detection system includes locking or unlocking a lock mechanism.

In addition to one or more of the features described above, or as an alternative, further embodiments may include where actuating the lock mechanism is constrained based on an estimated distance between the wearable biometric device and the lock mechanism.

In addition to one or more of the features described above, or as an alternative, further embodiments may include monitoring, by the control panel, a distance between the wearable biometric device and a paired device, and sending a separation notification to the wearable biometric device based on determining that the distance between the wearable biometric device and the paired device exceeds a separation distance threshold.

In addition to one or more of the features described above, or as an alternative, further embodiments may include monitoring movement of the wearable biometric device with respect to a predetermined location, and triggering an unlocking action of a lock mechanism based on determining that the wearable biometric device is approaching and within a threshold distance of the predetermined location.

In addition to one or more of the features described above, or as an alternative, further embodiments may include where sending a security alert from the control panel to the wearable biometric device responsive to detection of an intrusion event by one or more sensors of the intrusion detection system, and providing an indication of the security alert to the user of the wearable biometric device.

According to another embodiment, a method includes monitoring one or more biometric indicators of a user of a wearable biometric device and comparing the one or more biometric indicators to one or more medical condition indicators. The method also includes transmitting a medical response request from the wearable biometric device to a control panel of an intrusion detection system based on determining that at least one of the medical condition indicators is met. An alert message is sent from the control panel of the intrusion detection system to an assistance response system based on receiving the medical response request.

In addition to one or more of the features described above, or as an alternative, further embodiments may include where the alert message is customized and the assistance response system is selected from a plurality of assistance response systems based on a type of medical condition corresponding to the medical response request.

In addition to one or more of the features described above, or as an alternative, further embodiments may include determining a location of the wearable biometric device, and sending an indicator of the location of the wearable biometric device with the medical response request.

In addition to one or more of the features described above, or as an alternative, further embodiments may include where the wearable biometric device includes a fingerprint reader, and the method includes confirming an identity of the user responsive to fingerprint data read by the fingerprint reader.

In addition to one or more of the features described above, or as an alternative, further embodiments may include where the one or more biometric indicators include one or more of: blood pressure, heart beat rate, body temperature, and motion.

In addition to one or more of the features described above, or as an alternative, further embodiments may include sending a security alert from the control panel to the wearable biometric device responsive to detection of an intrusion event by one or more sensors of the intrusion detection system, and providing an indication of the security alert to the user of the wearable biometric device.

Technical effects of embodiments of the present disclosure include controlling actions and responses of an intrusion detection system based on gestures or events detected by a wearable biometric device.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
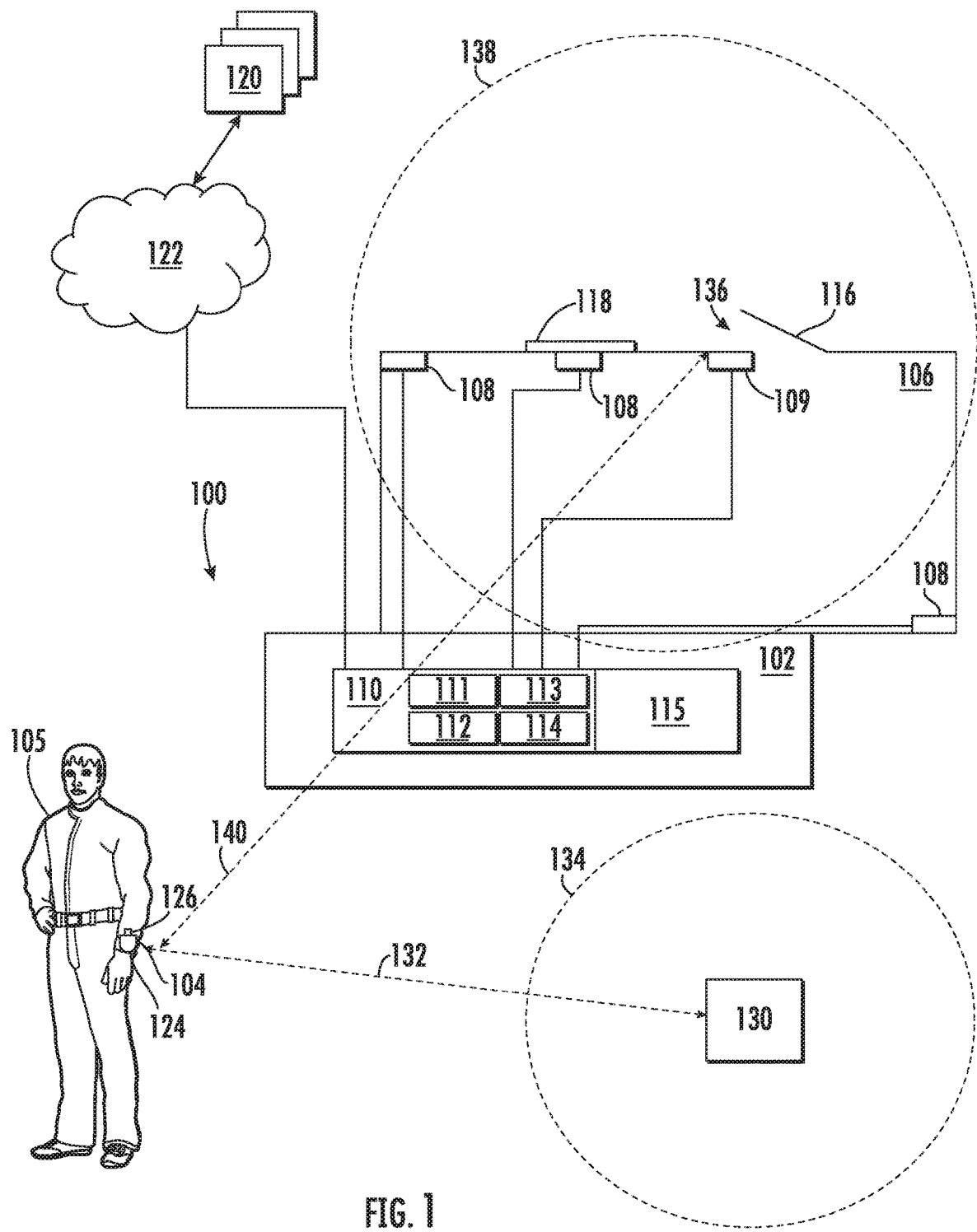
FIG. 1 depicts a system according to one or more embodiments.

Turning now to the figures, FIG. 1 depicts a system 100 according to one or more embodiments. The system 100 can include an intrusion detection system 102 with a control panel 110 operable to wirelessly communicate with one or more wearable biometric devices 104 for control and monitoring actions. For example, the control panel 110 of the intrusion detection system 102 may receive a command or health status indicator of a user 105 from a wearable biometric device 104, and the control panel 110 can send status indicators to the wearable biometric device 104 upon detecting an event at a monitored location 106. The monitored location 106 can be an access controlled space of any size, such as a locker, a room, an office, a suite, a floor of a building, a complete building/structure, or the like as monitored by a plurality of sensors 108. The sensors 108 can be incorporated with or communicatively coupled to the control panel 110. Examples of the sensors 108 can include, for example, one or more of a door sensor, a window sensor, a motion sensor, a glass breakage sensor, a camera, a microphone, a heat sensor, a smoke detector, a carbon monoxide detector, or any other type of sensor known in the art. One or more subsystems 109 of the intrusion detection system 102 can also be communicatively coupled to the control panel 110 and may include a lock mechanism associated with a door 116 or window 118 of the monitored location 106. In embodiments, the control panel 110 is operable to actuate the one or more subsystems 109, such as issuing a lock or unlock command.

The control panel 110 can include a processing system 111, a memory system 112, a communication interface 113, an input/output interface 114, and a user interface 115. The control panel 110 can include any processing hardware, software, or combination of hardware and software utilized by the intrusion detection system 102 to carry out computer readable program instructions by performing arithmetical, logical, and/or input/output operations. The memory system 112 of the control panel 110 stores program instructions that are executable by the processing system 111 to cause at least a portion of the operation described herein. The processing system 111 can include one or more central processing units (CPU(s)), also referred to as processing circuits, coupled via a system bus to the memory system 112 and various other components (e.g., the communication interface 113). The memory system 112 can include a read only memory (ROM) and a random access memory (RAM). The communication interface 113 can support wired and/or wireless communication formats such as cellular, Wi-Fi, Bluetooth, and other formats known in the art, for example, to communicate with the wearable biometric device 104 and/or one or more assistance response systems 120 via network 122. The input/output interface 114 is operable to communicate with the sensors 108 and subsystems 109. The user interface 115 can include a touch-sensitive interface, buttons, knobs, switches, displays, speakers, and other such inputs and/or outputs.

In embodiments, the wearable biometric device 104 can be a fitness tracking-type smart wristband, including for example, a wristband 124, and an electronics system 126 with one or more biometric sensors 230 (FIG. 2) and additional sensors 232 (FIG. 2) operable to detect conditions such as orientation, position, speed, acceleration, and the like. A paired device 130 may be associated with the wearable biometric device 104 but need not be included in embodiments. For example, the paired device 130 may be a handheld device, such as a mobile phone, tablet computer, or other similar device. Rather than using the paired device 130 to command features of the intrusion detection system 102, the wearable biometric device 104 is operable to detect gestures made by the user 105 and convert the gestures into commands for the control panel 110. The wearable biometric device 104 is also operable to receive status from the control panel 110 without intervention by the paired device 130.

The control panel 110 can monitor a distance 132 between the wearable biometric device 104 and the paired device 130. The control panel 110 can send a separation notification to the wearable biometric device 104 based on determining that the distance 132 between the wearable biometric device 104 and the paired device 130 exceeds a separation distance threshold 134. The control panel 110 may also monitor movement of the wearable biometric device 104 with respect to a predetermined location 136, such as a location at the door 116. The control panel 110 can trigger an unlocking action of a lock mechanism of subsystem 109 based on determining that the wearable biometric device 104 is approaching and within a threshold distance 138 of the predetermined location 136. Actuating the lock mechanism of subsystem 109 can be constrained based on an estimated distance 140 between the wearable biometric device 104 and the lock mechanism of subsystem 109. Constraining when gesture detection is active, such as when the estimated distance 140 is less than the threshold distance 138 ensures that movements and gestures by the user 105 are not taken out of context and interpreted as commands for the intrusion detection system 102 when the wearable biometric device 104 is remotely located out of range of the predetermined location 136. Position and distance values may be determined using actual position data (e.g., global positioning system (GPS) coordinates) or relative position (e.g., proximity sensors or relative signal strength).

The system 100 is an example and is not intended to suggest any limitation as to the scope of use or operability of embodiments described herein (indeed additional or alternative components and/or implementations may be used). Further, while single items are illustrated for items of the system 100, these representations are not intended to be limiting and thus, any item may represent a plurality of items.

Figure 2:
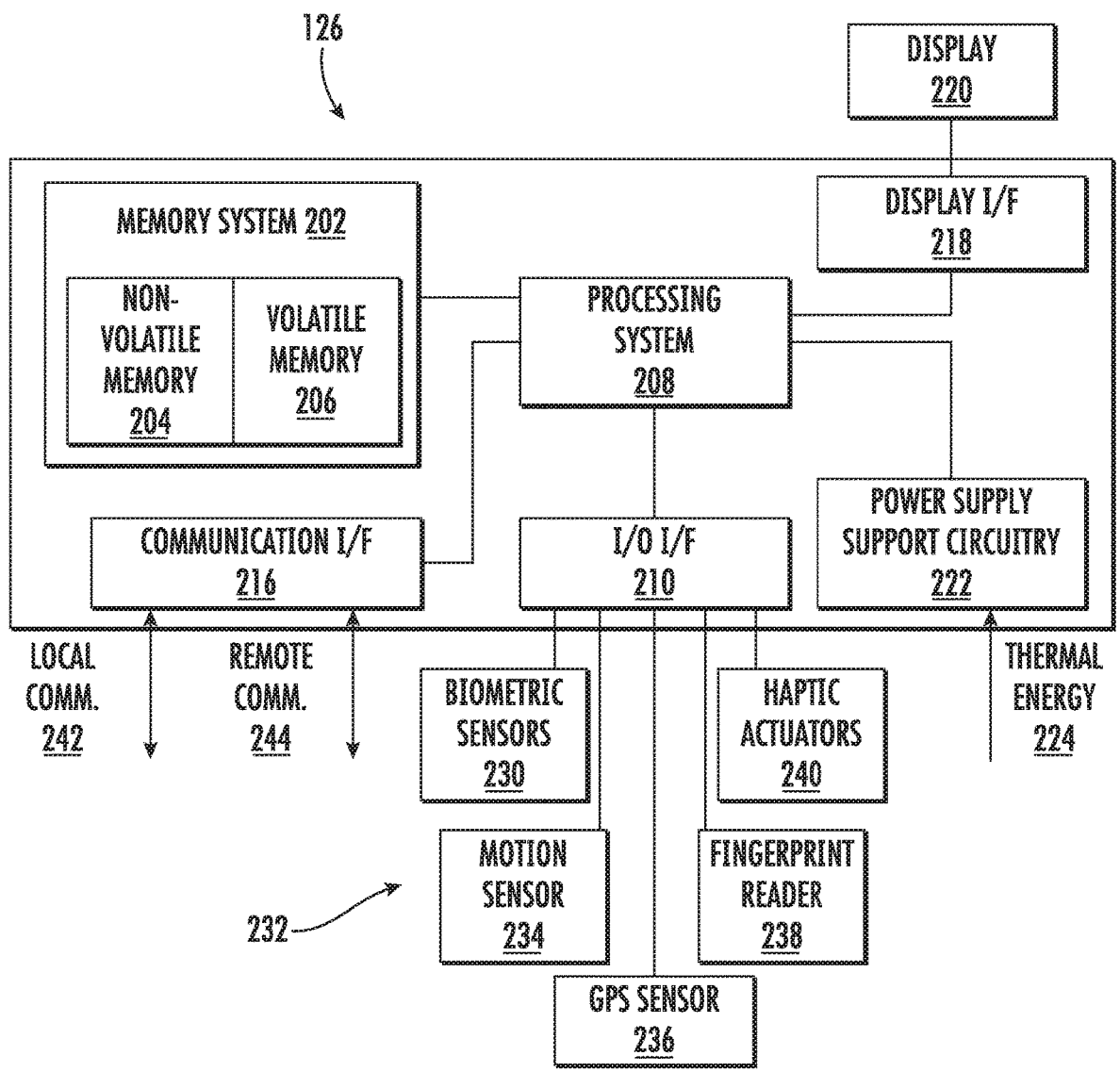
FIG. 2 depicts an electronics system of a wearable biometric device according to one or more embodiments.

Referring now to FIG. 2 with continued reference to FIG. 1, an example of the electronics system 126 in accordance with the present disclosure is shown. The electronics system 126 can include a memory system 202 which can store executable instructions and/or data associated with monitoring the user 105 and communicating with the control panel 110. The executable instructions can be stored or organized in any manner and at any level of abstraction, such as in connection with one or more applications, processes, routines, procedures, methods, etc. As an example, at least a portion of the instructions and associated data can be initially stored in non-volatile memory 204 of the memory system 202 and transferred to volatile memory 206 of the memory system 202 for faster execution, record creation, and the like. Volatile memory 206 typically loses its state upon a shutdown or absent sufficient memory refreshing. Non-volatile memory 204 is persistent and maintains state between shutdown and startup.

Further, as noted, the memory system 202 may store data. The data may include, but is not limited to, sensor data, event data, time history data, fault data, or any other type(s) of data as will be appreciated by those of skill in the art. The instructions stored in the memory system 202 may be executed by one or more processors, such as a processing system 208. The processing system 208 may be operative on the data.

The processing system 208, as shown, is coupled to input/output (I/O) interface 210 operable to receive sensor data from one or more biometric sensors 230 and additional sensors 232, such as motion sensor 234 (e.g., an accelerometer), a position sensor 236 (e.g., a GPS sensor), a fingerprint reader 238, and the like. Examples of the biometric sensors 230 can include a heartbeat sensor, a blood pressure sensor, a temperature sensor, and other such sensors known in the art. The motion sensor 234 can be used to detect gestures by the user 105, such as a "thumbs down" gesture to command locking of the door 116 and a "thumbs up" gesture to command unlocking of the door 116. Other gesture combinations and commands are contemplated. The position sensor 236 can be used for distance determinations or to identify a location of the wearable biometric device 104 particularly when a medical event associated with the user 105 is detected. The fingerprint reader 238 can be used to identify or confirm the identity of the user 105. The I/O interface 210 can also be communicatively coupled to one or more haptic actuators 240, for instance, to trigger a vibration as a notification of an alert or event from the control panel 110.

The components of the electronics system 126 may be operably and/or communicably connected through a communication interface 216 to the control panel 110 through one or more communication channel types. For example, a local communication channel 242 may include a communication signal type with a relatively low range, such as Bluetooth, while a remote communication channel 244 can include a communication signal type with a longer range, such as cellular. An ability to communicate with the control panel 110 using the local communication channel 242 can be used to verify proximity of the wearable biometric device 104 to the control panel 110.

The electronics system 126 can also include a display interface 218 operable to display messages or status indicators on a display 220. The size of the display 220 may be limited as a wearable device. The electronics system 126 can also include power supply support circuitry 222 operable to manage electrical power for the electronics system 126. In some embodiments, the power supply support circuitry 222 is operable to convert thermal energy 224 from the user 105 into electricity for battery charging/consumption by the electronics system 126, for instance, thermal electrics. Other energy sources may include a kinetic energy recharging system or a solar cell charging system, for example. The electronics system 126 may further include other features or components as known in the art.

Figure 3:
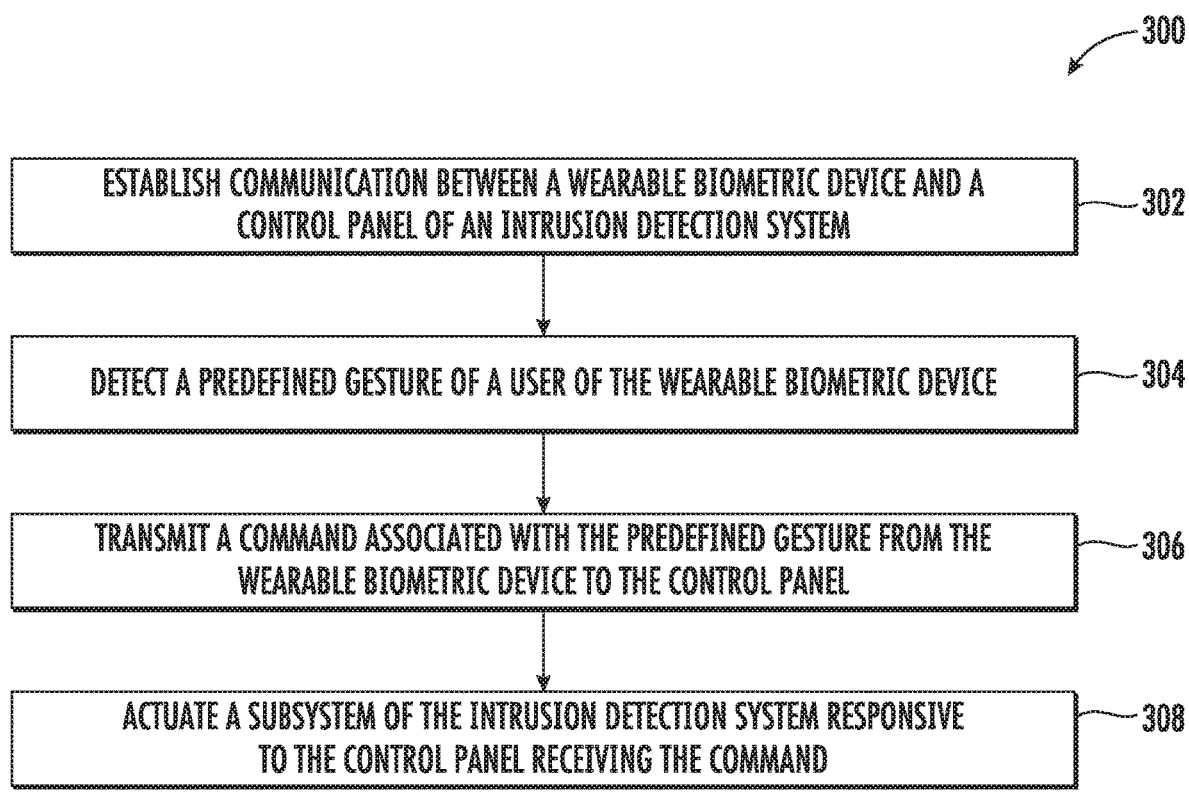
FIG. 3 depicts a process flow according to one or more embodiments.

FIG. 3 depicts a flow process 300 can be performed by elements of the system 100 of FIG. 1 as shown and described herein and/or by variations thereon. Various aspects of the flow process 300 can be carried out using one or more processing systems 111, 208. The flow process 300 is described in reference to FIGS. 1-3.

At block 302, communication is established between a wearable biometric device 104 and a control panel 110 of an intrusion detection system 102. At block 304, a predefined gesture of a user 105 of the wearable biometric device 104 is detected. There can be a plurality of pre-defined gestures defined in the memory system 202, which are used for comparison with respect to movements detected by the motion sensor 234. In some embodiments, the user 105 can enter a gesture programming mode and define customized movements of the wearable biometric device 104 to map to commands that are interpretable by the control panel 110. For instance, gestures can be defined for locking/unlocking, panic, alert triggers, status checking, thermostat adjustments, lighting states, and other home automation functions that may be commanded through the control panel 110.

At block 306, a command associated with the predefined gesture is transmitted from the wearable biometric device 104 to the control panel 110. The command can correspond to the one or more capabilities of the control panel 110.

At block 308, a subsystem 109 of the intrusion detection system 102 is actuated responsive to the control panel 110 receiving the command. Actuating the subsystem 109 of the intrusion detection system 102 can include locking or unlocking a lock mechanism. Actuating the lock mechanism may be constrained based on an estimated distance 140 between the wearable biometric device 104 and the lock mechanism of subsystem 109.

In some embodiments, the control panel 110 performs additional monitoring tasks for the user 105. For instance, the control panel 110 can monitor the distance 132 between the wearable biometric device 104 and a paired device 130 and send a separation notification to the wearable biometric device 104 based on determining that the distance 132 between the wearable biometric device 104 and the paired device 130 exceeds a separation distance threshold 134 (e.g., the user 105 left the paired device 130 and is moving away from it). Movement of the wearable biometric device 104 can also be monitored with respect to a predetermined location 136. An unlocking action of a lock mechanism of subsystem 109 can be triggered based on determining that the wearable biometric device 104 is approaching and within a threshold distance 138 of the predetermined location 136. A security alert can be sent from the control panel 110 to the wearable biometric device 104 responsive to detection of an intrusion event by one or more sensors 108 of the intrusion detection system 102. An indication of the security alert can be provided to the user 105 of the wearable biometric device 104, e.g., triggering the haptic actuators 240 responsive to a received alert.

Figure 4:
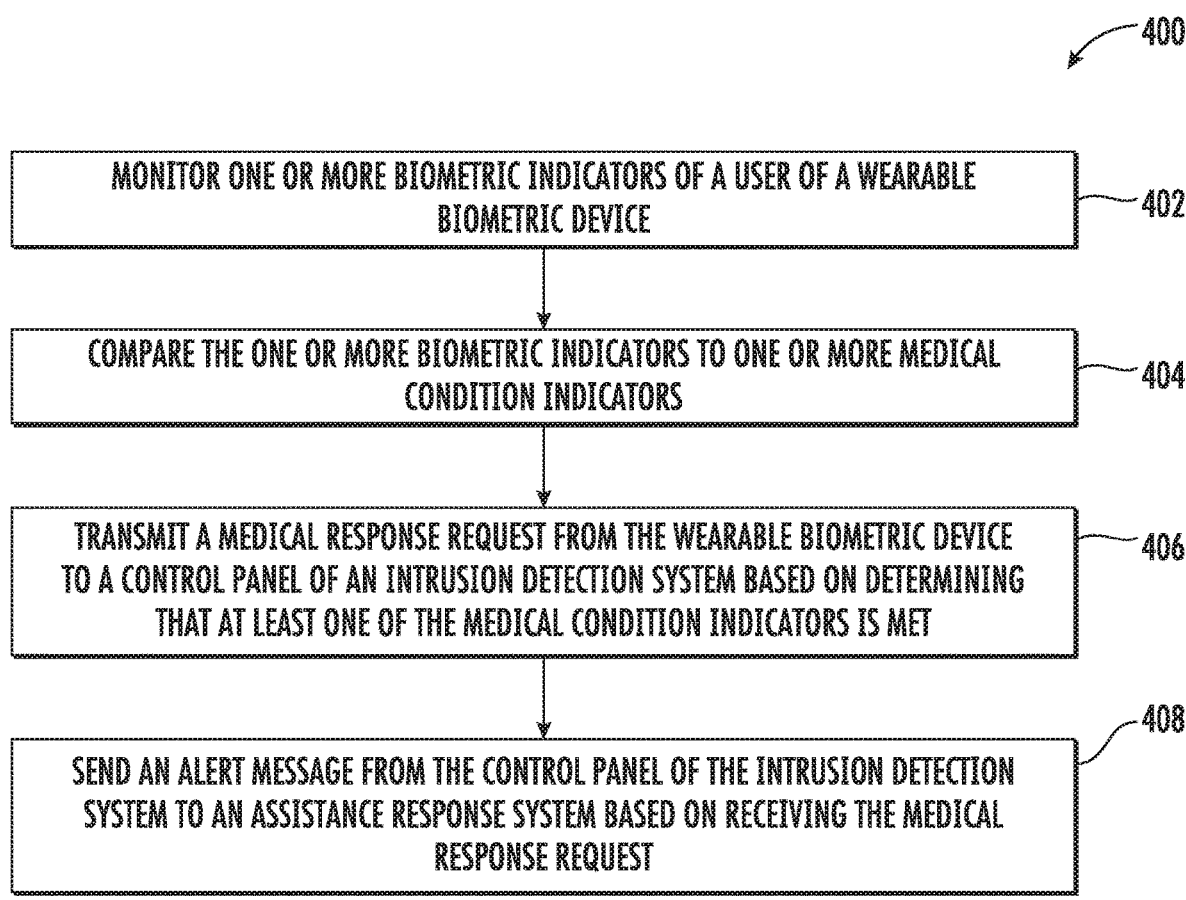
FIG. 4 depicts a process flow according to one or more embodiments.

FIG. 4 depicts a flow process 400 can be performed by elements of the system 100 of FIG. 1 as shown and described herein and/or by variations thereon. Various aspects of the flow process 400 can be carried out using one or more processing systems 111, 208. The flow process 400 is described in reference to FIGS. 1-4.

At block 402, one or more biometric indicators are monitored of a user 105 of a wearable biometric device 104 through biometric sensors 230. The one or more biometric indicators can include one or more of: blood pressure, heart beat rate, body temperature, and motion.

At block 404, the one or more biometric indicators are compared to one or more medical condition indicators. For example, medical condition indicators can include parameters that define a high level of stress, a loss of consciousness, a fever, an abnormal heartbeat, an abnormal blood pressure, death, or other conditions.

At block 406, a medical response request can be transmitted from the wearable biometric device 104 to the control panel 110 of the intrusion detection system 102 based on determining that at least one of the medical condition indicators is met. For example, medical responses can vary based on severity of the condition, a location of the wearable biometric device 104, the duration of a medical event, and other factors.

At block 408, the control panel 110 can sent an alert message from the intrusion detection system 102 to an assistance response system 120 based on receiving the medical response request. The alert message can be customized, and the assistance response system 120 may be selected from a plurality of assistance response systems 120 based on a type of medical condition corresponding to the medical response request. For instance, some medical conditions may result in triggering a request for an ambulance, while others may alert a family member or trigger a physician notification.

The location of the wearable biometric device 104 may be determined, for example, using the position sensor 236. An indicator of the location of the wearable biometric device 104 can be sent with the medical response request to the control panel 110. In some embodiments, the wearable biometric device 104 includes a fingerprint reader 238, and an identity of the user 105 can be confirmed responsive to fingerprint data read by the fingerprint reader 238.

A security alert may be sent from the control panel 110 to the wearable biometric device 104 responsive to detection of an intrusion event by one or more sensors 108 of the intrusion detection system 102. An indication of the security alert can be provided to the user 105 of the wearable biometric device 104, for instance, on the display 220 and/or via haptic actuators 240.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system comprising:
 a wearable biometric device operable to monitor one or more biometric indicators of a user, the wearable biometric device comprising one or more biometric sensors, at least one motion sensor, a position sensor, and power supply support circuitry operable to convert energy into electricity for an electronics system of the wearable biometric device; and
 an intrusion detection system comprising one or more sensors and a control panel operable to monitor the one or more sensors, establish communication with the wearable biometric device, and perform an action responsive to an event detected by the one or more sensors or the wearable biometric device, wherein the wearable biometric device is configured to receive a security alert from the control panel responsive to event detection by the one or more sensors of the intrusion detection system and provide an indication of the security alert to the user of the wearable biometric device, and wherein the indication of the security alert is provided through one or more haptic actuators of the wearable biometric device.

2. The system of claim 1, wherein the wearable biometric device is configured to detect a predefined gesture of the user of the wearable biometric device and transmit a command associated with the predefined gesture from the wearable biometric device to the control panel.

3. The system of claim 2, wherein the intrusion detection system comprises one or more subsystems, and the control panel is configured to actuate at least one of the subsystems responsive to receiving the command.

4. The system of claim 1, wherein the wearable biometric device is configured to compare the one or more biometric indicators to one or more medical condition indicators and transmit a medical response request to the control panel based on determining that at least one of the medical condition indicators is met.

5. The system of claim 4, wherein the control panel is configured to send an alert message to an assistance response system based on receiving the medical response request.

6. The system of claim 1, wherein the control panel is configured to monitor movement of the wearable biometric device with respect to a predetermined location and trigger an unlocking action of a lock mechanism based on determining that the wearable biometric device is approaching and within a threshold distance of the predetermined location.

7. The system of claim 1, wherein the electronics system of the wearable biometric device comprises a memory system, a processing system, an input/output interface, a communication interface, and a display interface, and the power supply support circuitry is configured to convert one or more of thermal energy and kinetic energy into electricity for the electronics system.

8. A method comprising:
establishing communication between a wearable biometric device and a control panel of an intrusion detection system, the wearable biometric device comprising one or more biometric sensors, at least one motion sensor, a position sensor, and power supply support circuitry operable to convert energy into electricity for an electronics system of the wearable biometric device;
detecting a predefined gesture of a user of the wearable biometric device;
transmitting a command associated with the predefined gesture from the wearable biometric device to the control panel;
actuating a subsystem of the intrusion detection system responsive to the control panel receiving the command;
sending a security alert from the control panel to the wearable biometric device responsive to detection of an intrusion event by one or more sensors of the intrusion detection system; and
providing an indication of the security alert to the user of the wearable biometric device, wherein the indication of the security alert is provided through one or more haptic actuators of the wearable biometric device.

9. The method of claim 8, wherein actuating the subsystem of the intrusion detection system comprises locking or unlocking a lock mechanism.

10. The method of claim 9, wherein actuating the lock mechanism is constrained based on an estimated distance between the wearable biometric device and the lock mechanism.

11. The method of claim 8, further comprising:
monitoring, by the control panel, a distance between the wearable biometric device and a paired device; and
sending a separation notification to the wearable biometric device based on determining that the distance between the wearable biometric device and the paired device exceeds a separation distance threshold.

12. The method of claim 8, further comprising:
monitoring movement of the wearable biometric device with respect to a predetermined location; and
triggering an unlocking action of a lock mechanism based on determining that the wearable biometric device is approaching and within a threshold distance of the predetermined location.

13. A method comprising:
monitoring one or more biometric indicators of a user of a wearable biometric device, the wearable biometric device comprising one or more biometric sensors, at least one motion sensor, a position sensor, and power supply support circuitry operable to convert energy into electricity for an electronics system of the wearable biometric device;
comparing the one or more biometric indicators to one or more medical condition indicators;
transmitting a medical response request from the wearable biometric device to a control panel of an intrusion detection system based on determining that at least one of the medical condition indicators is met;
sending an alert message from the control panel of the intrusion detection system to an assistance response system based on receiving the medical response request;
sending a security alert from the control panel to the wearable biometric device responsive to detection of an intrusion event by one or more sensors of the intrusion detection system; and
providing an indication of the security alert to the user of the wearable biometric device, wherein the indication of the security alert is provided through one or more haptic actuators of the wearable biometric device.

14. The method of claim 13, wherein the alert message is customized and the assistance response system is selected from a plurality of assistance response systems based on a type of medical condition corresponding to the medical response request.

15. The method of claim 13, further comprising:
determining a location of the wearable biometric device; and
sending an indicator of the location of the wearable biometric device with the medical response request.

16. The method of claim 13, wherein the wearable biometric device comprises a fingerprint reader, and the method further comprises:
confirming an identity of the user responsive to fingerprint data read by the fingerprint reader.

17. The method of claim 13, wherein the one or more biometric indicators comprise one or more of: blood pressure, heart beat rate, body temperature, and motion.

* * * * *